(12) United States Patent
Senneff et al.

(10) Patent No.: US 10,829,223 B2
(45) Date of Patent: Nov. 10, 2020

(54) BUTTON ASSEMBLY FOR SEAT POSITION CONTROL

(71) Applicant: ITT MANUFACTURING ENTERPRISES LLC, Wilmington, DE (US)

(72) Inventors: James Senneff, Buffalo, NY (US); Timothy Boerschig, Amherst, NY (US); Terrance E. Daul, Hamburg, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 20 days.

(21) Appl. No.: 16/241,052

(22) Filed: Jan. 7, 2019

(65) Prior Publication Data

US 2019/0135439 A1 May 9, 2019

Related U.S. Application Data

(63) Continuation of application No. 15/156,373, filed on May 17, 2016, now Pat. No. 10,173,778.

(51) Int. Cl.
*B64D 11/06* (2006.01)
*F16C 1/12* (2006.01)
(Continued)

(52) U.S. Cl.
CPC ............ *B64D 11/064* (2014.12); *A47C 1/02* (2013.01); *B60N 2/02* (2013.01); *F16C 1/102* (2013.01);
(Continued)

(58) Field of Classification Search
CPC ..... B64D 11/0639; B64D 11/064; A47C 1/02; F16C 1/10; F16C 1/102; F16C 1/12;
(Continued)

(56) References Cited

U.S. PATENT DOCUMENTS

| 2,605,374 A | 7/1952 | Batcheller | H01H 13/183 |
| | | | 200/295 |
| 3,213,189 A | 10/1965 | Mitchell | F16B 9/0253 |
| | | | 174/138 R |

(Continued)

FOREIGN PATENT DOCUMENTS

| DE | 196 50 823 C1 | 1/1998 |
| EP | 0 796 576 A1 | 9/1997 |

OTHER PUBLICATIONS

European Search Report for EP 17 169 026.6; dated Jul. 31, 2017; 8 pages.
(Continued)

*Primary Examiner* — Adam D Rogers
(74) *Attorney, Agent, or Firm* — Barclay Damon LLP

(57) ABSTRACT

Button assemblies for controlling a seat position and for mounting on a seat panel are provided. The button assemblies may have a button housing having a portion that is configured to position over edges of an opening in the seat panel. One or more flexible retaining members integral to or attached to the button housing are configured to compress through the opening in the seat panel and expand therein positioned opposite an inner surface thereof upon insertion, securing the assembly within the opening.

20 Claims, 4 Drawing Sheets

(51) Int. Cl.
*G05G 1/02* (2006.01)
*H02B 1/048* (2006.01)
*A47C 1/02* (2006.01)
*F16C 1/10* (2006.01)
*B60N 2/02* (2006.01)

(52) U.S. Cl.
CPC ................ *F16C 1/12* (2013.01); *G05G 1/02* (2013.01); *H02B 1/048* (2013.01)

(58) Field of Classification Search
CPC .......... G05G 1/02; G05G 1/025; H02B 1/048; H01H 9/02; H01H 13/56; H01H 17/00; H01H 17/16; H01H 17/18; H01H 19/003; H01R 13/74; H01R 13/743; H01R 13/745; B60N 2/02
See application file for complete search history.

(56) References Cited

U.S. PATENT DOCUMENTS

| | | | |
|---|---|---|---|
| 4,159,405 A | 6/1979 | Semonchik et al. | |
| 4,211,905 A | 7/1980 | Quigley | H02B 1/048 200/16 C |
| 4,515,034 A | 5/1985 | Porter | |
| 4,715,096 A * | 12/1987 | Fleming | B60R 22/322 24/602 |
| 5,010,780 A | 4/1991 | Hatfield | F16C 1/12 74/501.5 R |
| 5,146,056 A | 9/1992 | Kuczynski | H02B 1/048 200/295 |
| 5,541,569 A | 7/1996 | Jang | |
| 5,727,675 A | 3/1998 | Leveque et al. | |
| 6,132,245 A | 10/2000 | Wertz | H01R 13/5219 439/268 |
| 6,313,404 B1 | 11/2001 | Yu | H02B 1/048 174/50 |
| 7,459,649 B2 | 12/2008 | Huang | H02B 1/048 200/321 |
| 7,984,521 B2 * | 7/2011 | Schintler | E03C 1/2302 4/684 |
| 8,809,715 B2 | 8/2014 | Meyer | F16C 1/10 200/314 |
| 9,640,343 B2 | 5/2017 | Koch | H01H 9/0207 |
| 10,438,762 B1 * | 10/2019 | I | H01H 13/56 |
| 10,696,191 B2 * | 6/2020 | Does | B60N 2/20 |
| 2018/0218850 A1 * | 8/2018 | Bigge | H02B 1/044 |

OTHER PUBLICATIONS

European Examination Report for EP 17 169 026.6; dated Sep. 10, 2018; 3 pages.
Machine translation of DE 19650823 C1 obtained on Sep. 19, 2017.

\* cited by examiner

BUTTON ASSEMBLY FOR SEAT POSITION CONTROL

CROSS-REFERENCE TO RELATED APPLICATION

This application is a continuation application of U.S. Ser. No. 15/156,373, filed May 17, 2016 pursuant to applicable portions of 35 U.S.C. § 120 and 37 C.F.R. § 1.53, the entire contents of which is incorporated by reference.

TECHNICAL FIELD

This application generally relates to the field of mechanical actuators that are used, for example, in connection with reclining seats and related systems, and more particular to button assemblies for controlling positions of such seats.

BACKGROUND

Reclining seats or chairs are commonly deployed in various industries, including, for example, the airline industry. Typically, hydraulic or mechanical actuators are used to allow for positioning such seats in various positions. For example, the actuators enable the seat to assume an upright position as well as a continuous range of reclined positions. In order to control the positions of these seats, at least one control button may be provided. The control buttons may be used to engage, for example, an activator cable for the seat system, wherein the button assemblies may be deployed within armrests or other seat panels.

In terms of manufacture, prior art button assemblies normally require the installer to hold the button assembly from the underside while installing a button housing or sleeve on the outside in order to lock the button assembly into the panel. This may be difficult, particularly if space is limited around the button assembly. Therefore, a general need exists for enhanced button assemblies for controlling the position of reclining seats, which are also capable of being quickly and easily installed from the outside of the panel.

BRIEF DESCRIPTION

Therefore and according to one aspect, there is provided a button assembly for controlling a seat position and mounting on a seat panel. The button assemblies may have a button housing configured to position over edges of an opening in the seat panel and opposite an outer surface thereof. One or more flexible retaining members may be attached to a portion of the button housing, in which the one or more flexible retaining members are configured to compress when advanced through the opening in the seat panel and expand therein positioned opposite an inner surface thereof when the assembly is seated.

In another aspect, the one or more flexible retaining members include at least one flexible finger extending outward from the button housing. The flexible finger may be configured to expand into the seat panel with ends of the flexible finger positioned opposite the inner surface of the seat panel. A mechanical force of the ends of the flexible finger against the inner surface of the seat panel may inhibit removal of the button assembly from the seat panel.

In a further aspect, the one or more flexible retaining members include at least one flexible reflexed portion, the flexible reflexed portion bowing outward from the button assembly. The flexible reflexed portion may be configured to compress through the opening in the seat panel and expand into the seat panel with middle portions of the flexible reflexed portion positioned opposite the inner surface of the seat panel. A frictional force of the middle portion of the flexible reflexed portion against the edge of opening in the seat panel may inhibit removal of the button assembly from the seat panel.

An advantage realized by the herein described button assembly is that in ease and reliability of manufacture relative to a seat panel. The button assemblies can be fabricated without requiring additional materials or cost and in which the assemblies can be assembled within a space constrained environment and in a simpler manner due to the ability for the button assembly to snap into the seat panel without having to be held in place during a complex mounting operation.

These and other embodiments, features and advantages will become apparent to those skilled in the art when taken with reference to the following more Detailed Description in conjunction with the accompanying drawings that are first briefly described.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

DETAILED DESCRIPTION

The following Detailed Description should be read with reference to the drawings, in which like elements in different drawings are identically numbered. The drawings, which are not necessarily to scale, depict selected embodiments and are not intended to limit the scope of the invention. The Detailed Description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

The present disclosure provides, in part, button assemblies for controlling seat positions, for use in, for example, airline seats. By way of example, airline seats may include positioning features for passenger comfort during travel. For example, seat backs may recline, foot rests may extend outward, lumbar supports may be provided, etc. Space around the button assembly may be limited, such as in a seat arm. This limitation in space makes it difficult to install a button assembly, particularly if the button assembly must be held from the underside for purposes of installation. Advantageously, the present disclosure provides button assemblies, such as snap-in button assemblies that are capable of being mounted on a seat panel, such as an armrest or a sidewall quickly and easily from the outside of the panel only. By contrast with conventional button assemblies, the button assemblies disclosed herein may be mounted onto the seat panel or armrest without having to hold the button assembly from the underside of the panel where space is limited. For example, the present button assemblies include one or more flexible retaining members which compress through a seat panel opening during installation and expand to a nominal position once the button assembly is advanced through the opening within the seat panel.

Figure 1A:
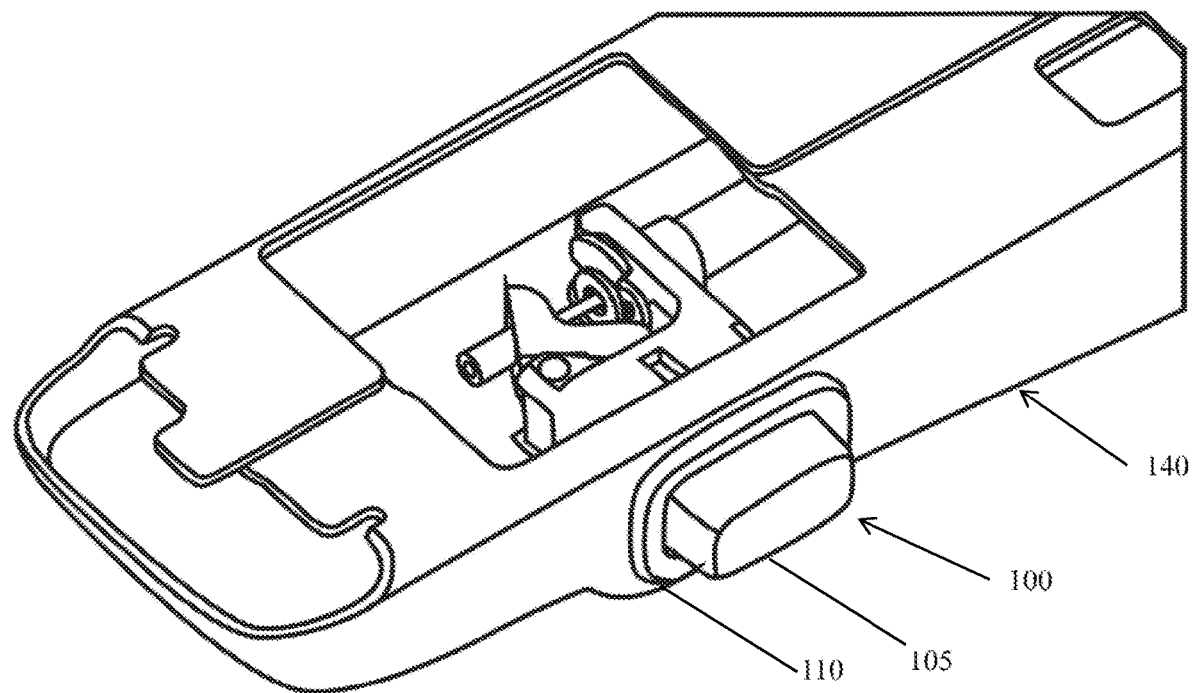
FIG. 1A is a side perspective view of a button assembly in accordance with one embodiment as mounted in a seat arm panel of a seat, and in accordance with aspects set forth herein.
Figure 1B:
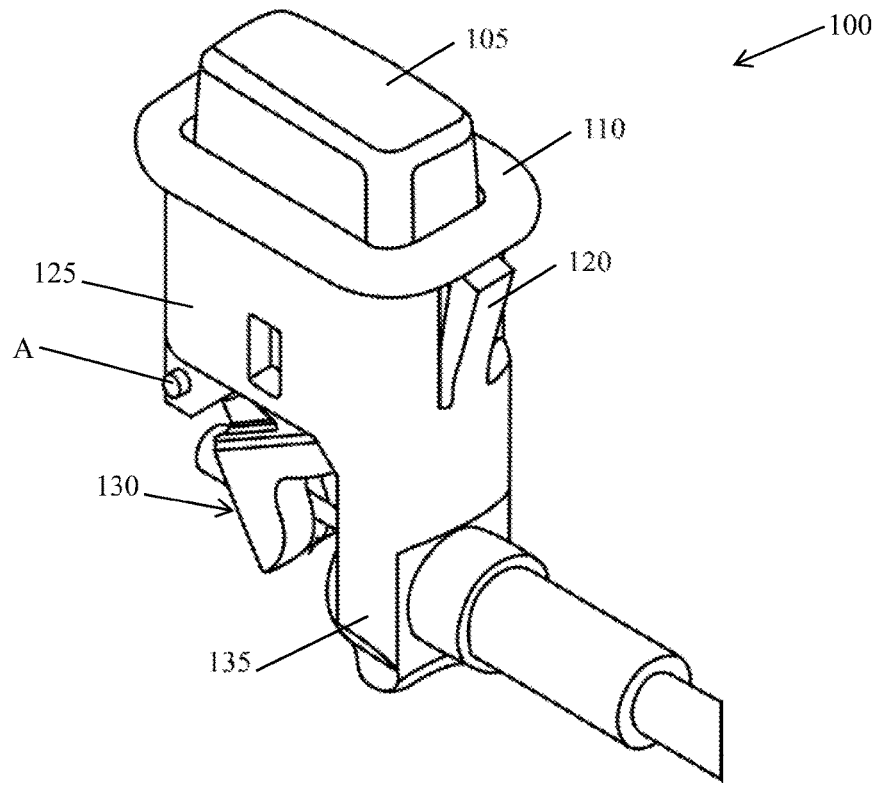
FIG. 1B is a top perspective view of the button assembly of FIG. 1A.

FIGS. 1A-1E depict a button assembly 100 in accordance with a first embodiment. With reference to FIG. 1A, the button assembly 100 is shown in a mounted position relative to a seat panel 140 (partially shown), the assembly 100 including an actuable button 105 which is used selectively by the occupant of the seat to control a position of the seat (not shown), as described in detail herein.

FIGS. 1B-1E provide various views of the button assembly 100, in accordance with FIG. 1A. The button assembly 100 according to this embodiment includes an actuable button 105, a button housing 125 and one or more flexible retaining members 120, as well as an outer cap or cover portion 110.

Figure 1C:
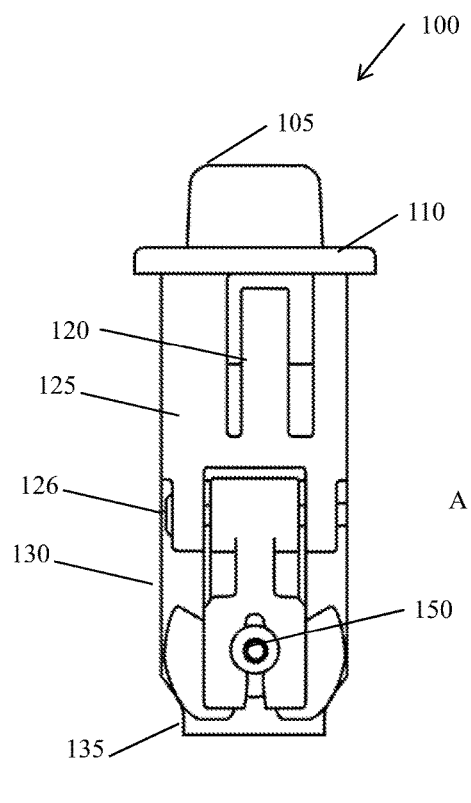
FIG. 1C is an end view of the button assembly of FIGS. 1A-1B.
Figure 1D:
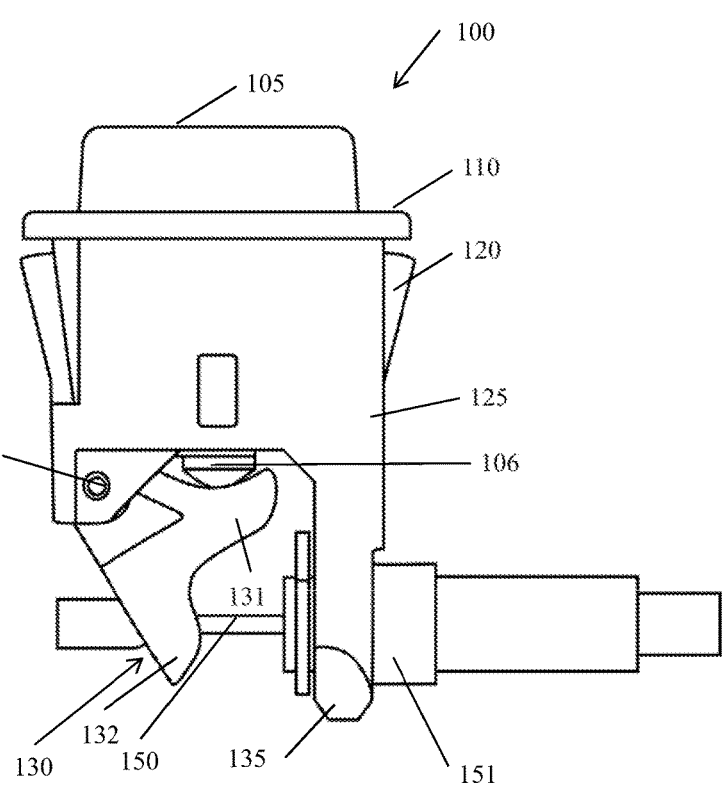
FIG. 1D is a side elevational view of the button assembly of FIGS. 1A-1C.
Figure 1E:
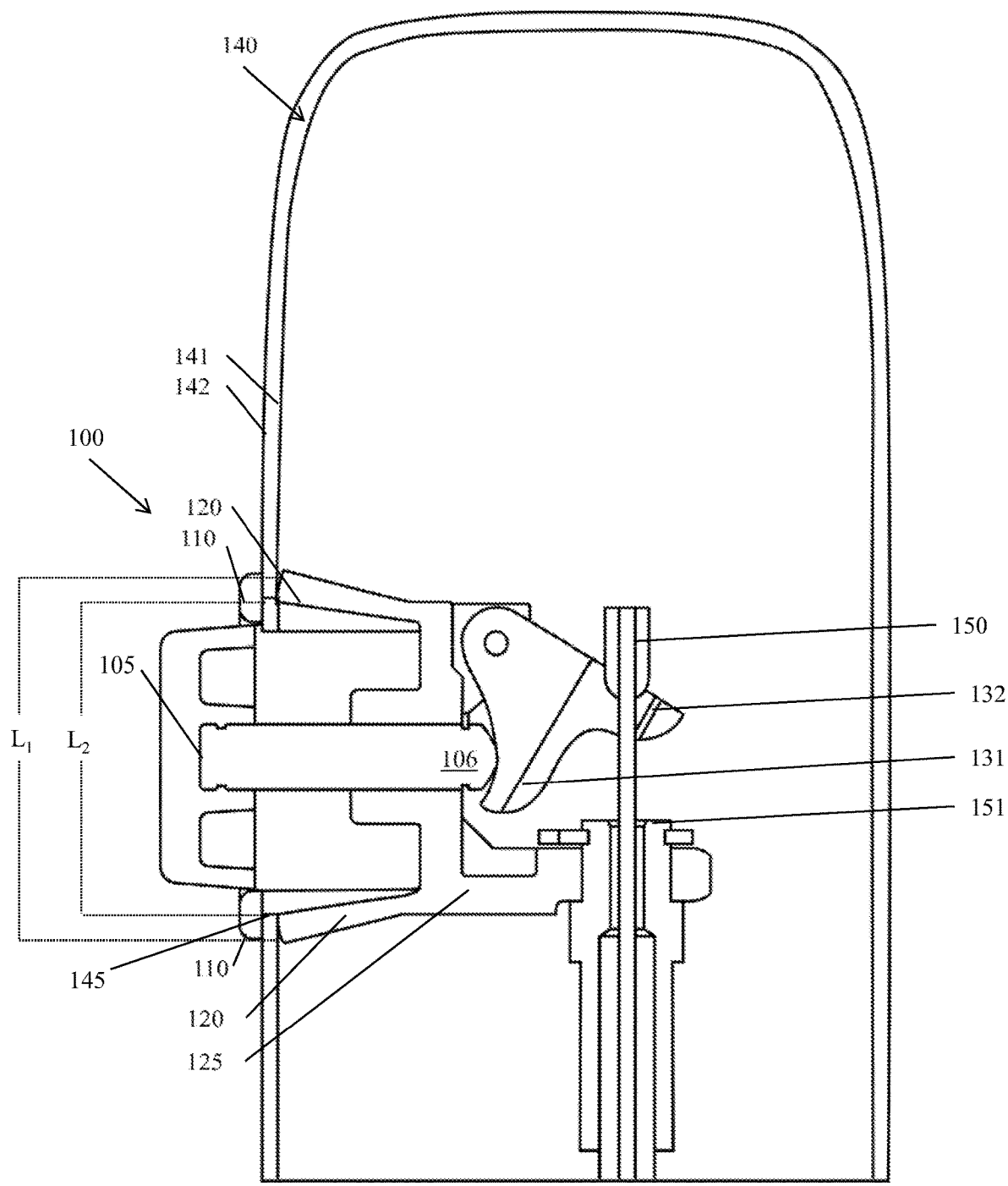
FIG. 1E is a side elevational view, shown in section, of the button assembly of FIGS. 1A-1D shown in an assembled position in a seat panel.

Further, the button assembly 100 according to this depicted embodiment includes a control cable activator 130 and a control cable holder 135, attached to a lower end of the button housing 125. When installed and as best shown in FIGS. 1C-1E, the control cable activator 130 includes a first engagement arm 131 that is initially disposed in relation to a lower shaft-like portion 106 of the actuable button 105 and a second engagement arm 132 having a through opening that supports a portion of a control cable 150, the latter being further housed within a control cable control sleeve 151. In operation, pressing the actuable button 105 will cause the lower portion 106 of the button 105 to contact the first engagement arm 131 of the control cable activator 130, the latter being pivotally attached by means of a pinned bracket 126 to the button housing 125 at a pivot point A. When engaged and according to this embodiment, the control cable activator 130 rotates clockwise, causing the supported control cable 150 to move from a first position to a second position (to the left as viewed in FIG. 1D and upward as shown in FIG. 1E). The control cable sleeve 151 is held in place, preferably by the control cable holder 135 during such movement.

FIG. 1E is a cross-sectional view of the button assembly 100 as mounted in an opening 145 in seat panel 140, in accordance with aspects set forth herein. According to this embodiment, a flexible retaining member 120 is provided on opposing lateral sides of the button housing 125, each flexible retaining member 120 being defined by a wedge shaped configuration including a cantilevered end that extends outwardly relative to the exterior surface of the button housing 125. When fabricated, the retaining members nominally assume a outwardly flexed position in which each member is configured to inwardly flex toward the outer surface of the button housing 125 when acted upon by a compressive force.

Upon insertion of the button assembly 100 into the seat panel 140 and when passing the edge of the opening 145, the inserted end of the one or more flexible retaining members 120 has a narrower width than the outer end, so that the members 120 may readily pass through the opening 145 and into the seat panel 140. As the button assembly 100 progresses into the opening 145, the one or more flexible retaining member 120 flex inward against the compressive force of the edges of the opening 145, allowing entry into the defined opening 145. Once the widest portion of the flexible retaining members 120 clears the opening 145, the flexible retaining members 120 are caused to bend outward, thereby returning the members to their original cantilevered shape and position due to the cessation of the compressive force. In the nominal seated position of the button assembly 100 within the seat panel 140 depicted in FIG. 1E, the cantilevered ends of flexible retaining members 120 are positioned opposite an inner surface 141 of the seat panel 140, and beyond the outer edge of the opening 145. This cantilevered positioning of the one of more flexible retaining members 120 against the inner surface 141 restricts removal of the button assembly 140 from the seat panel 140.

Still referring to FIG. 1E and when the button assembly 100 is seated, the outer cover or cap portion 110 of the button housing 125 defines a shoulder that covers an edge surface of the opening 145 in which the upper cover or cap portion 110 has an outer dimension ($L_1$) relative to the width ($L_2$) of the opening 145. In such a case, the upper cover or cap portion 110 of the button housing 125 is therefore positioned over the edge of the opening 145 and against the outer surface 142 of the seat panel 140. As previously noted, the number of flexible retaining members 120 may vary, depending on the mechanical strength desired, the materials employed, the dimensions of the parts, etc.

Figure 2:
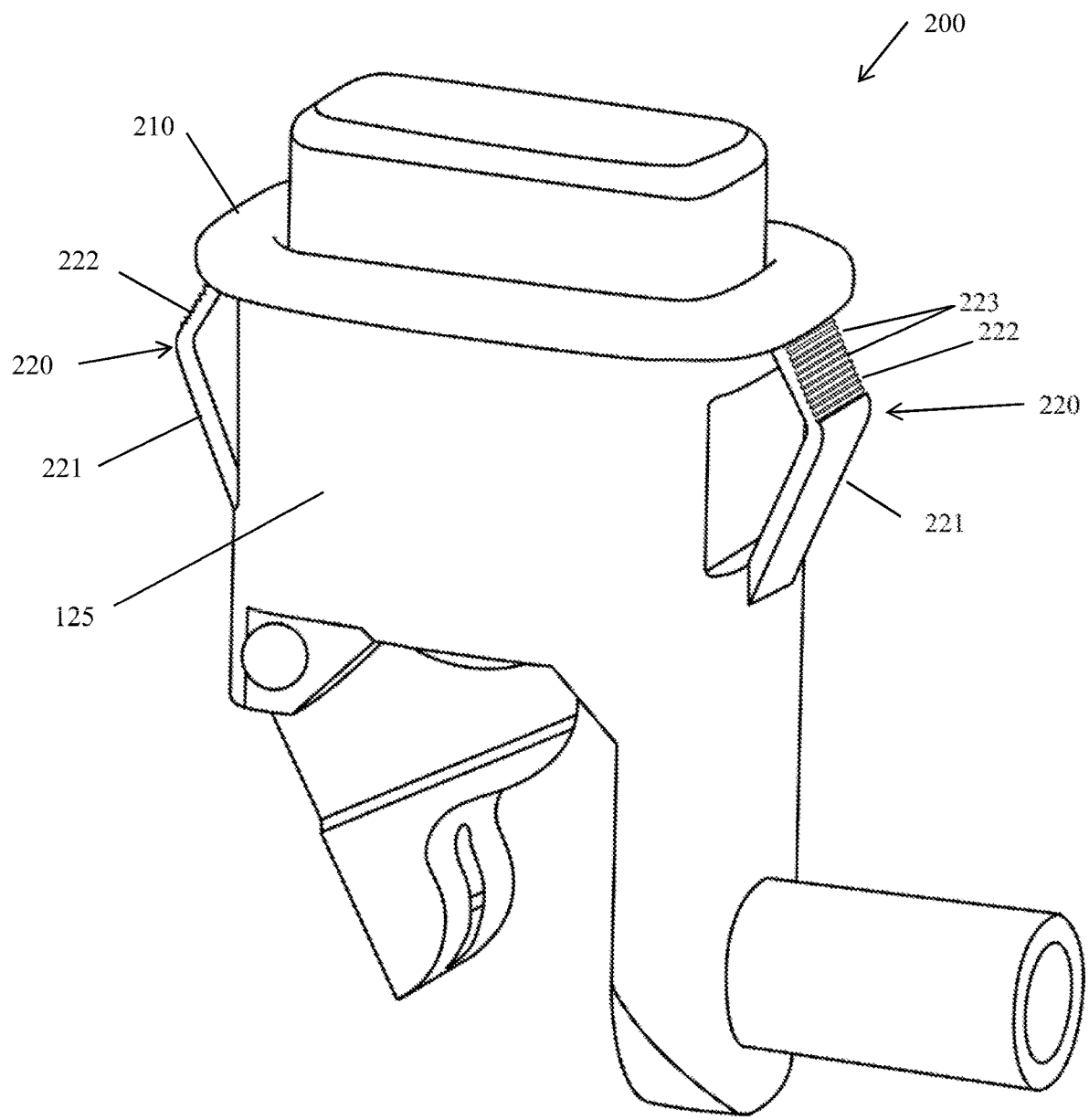
FIG. 2 is a side perspective view of a button assembly in accordance with another embodiment.

It will be understood that other configurations are possible. For example, FIG. 2 depicts a button assembly 200, in accordance with another embodiment. This assembly 200 includes a pair of flexible retaining members 220 that are defined by a first cantilevered portion 221 extending outwardly from an exterior lateral wall surface of the housing 125 at an acute angle and a second reflexed portion 222 that inwardly extends from the cantilevered portion 221 toward the bottom surface of a shoulder formed by the upper cover or cap portion 210 of the assembly 200. According to this specific embodiment, each of the retaining members 220 assumes a substantial "V-shape." After insertion of the button assembly 200 into an opening defined in the seat panel (not shown in this view), the V-shaped retaining members 220 are caused to compress inwardly to permit assembly but in which the members are caused to expand outwardly and revert to their substantial "V-shape" once the members have cleared the opening into the seat panel. As in the prior described embodiment, the retaining members 220 prevent or inhibits removal of the seated assembly against the edges of the opening in the seat panel.

In operation, the cantilevered and reflexed portions 221, 222 are configured to move inwardly or compress upon insertion of the button assembly 200 into the opening in a seat panel (not shown) and then expand outwardly within the seat panel in the position shown in FIG. 2. Frictional forces between the edge of the opening in a seat panel and each retaining member 220 may further be increased by the addition of ribs 223, to further inhibit removal of the button assembly 200 after insertion into a seat panel.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A method for assembling a button assembly on a seat panel in order to control the position of a seat, the method comprising:
    installing a button housing through an opening formed in the seat panel, the button housing having an upper end and a lower end;
    compressing one or more flexible retaining members of the button housing to enable the lower end of the button housing to be fitted through the opening of the seat panel, the one or more flexible retaining members being expanded upon attachment to engage an inner surface of the seat panel to insure retention of the button assembly within the seat panel opening; and
    engaging a cover portion at the upper end of the button housing, the cover portion having a width larger than the width of the opening so as to bear against an outer surface of the seat panel,
    wherein the installing of the button housing enables actuation of an actuable button extending outwardly of the cover portion, and in which engagement of the actuable button causes a lower shaft portion extending from a lower portion of the button housing to engage a control cable activator attached to the lower end of the button housing in order to control the position of the seat.

2. The method according to claim 1, in which the control cable activator is pivotally attached to the lower end of the button housing and includes a first engagement arm and a second engagement arm.

3. The method according to claim 2, in which the second engagement arm supports a control cable and in which the lower shaft portion of the actuable button engages the first engagement arm.

4. The method according to claim 3, in which the first engagement arm is defined by an inwardly curved surface.

5. The method according to claim 2, wherein engagement of the lower shaft portion of the actuable button causes a control cable supported by the second engagement arm to be moved from a first position to a second position.

6. The method according to claim 5, in which the control cable activator includes a control cable holder that secures the control cable during the movement from the first position to the second position.

7. The method according to claim 1, in which each of the flexible retaining members include a flexible finger cantilevered from the button housing having an extending end that contacts the inner surface of the seat panel to prevent removal of the button housing from the seat panel.

8. The method according to claim 1, in which each of the flexible retaining members include a pair of portions that outwardly extend from the button housing, the pair of portions forming a substantial V-shape.

9. The method according to claim 8, wherein at least one of the outwardly extending portions includes a set of ribs for contacting the inner surface of the seat panel.

10. A method for manufacturing a button assembly for use in a seat panel, the method comprising:
    providing a button housing having an upper end and an opposing lower end;
    providing one or more flexible retaining members on the button housing extending through an upper portion of the button housing and extending outwardly, the one or more flexible retaining members being shaped and sized to compress when the button housing is initially fitted in an opening of the seat panel and expand upon assembly into the opening so as to engage an inner surface of the seat panel to prevent the button housing from being removed from the seat panel after assembly;
    providing the upper end of the button housing with a cover portion that is larger than the opening of the seat panel so as to cover and engage a periphery of the opening;
    providing an actuable button extending above the cover portion including a lower shaft portion that extends from a lower portion of the button housing; and
    attaching a control cable activator to the lower end of the button housing in which the control cable activator is movable between first and second positions based on the position of the actuable button to act upon a control cable supported by the control cable activator.

11. The method according to claim 10, in which the control cable activator includes a first engagement arm aligned with the lower shaft portion of the actuable button and a second engagement arm that supports the control cable.

12. The method according to claim 11, wherein the control cable activator is pivotally supported by the button housing.

13. The method according to claim 12, in which the first engagement arm includes an inwardly curved surface engaged by the lower shaft portion of the actuable button when the button is actuated.

14. The method according to claim 10, in which the button housing is unitary.

15. The method according to claim 10, in which each of the flexible retaining members include a flexible finger cantilevered from the button housing, each flexible finger having an extending end that contacts the inner surface of the seat panel to prevent removal.

16. The method according to claim 10, in which each of the flexible retaining members include a pair of portions that outwardly extend from the button housing, the pair of portions forming a substantial V-shape.

17. A method for controlling the position of a seat, the method comprising:
    installing a button assembly into an opening formed in a seat panel, the button assembly including at least one flexible retaining member that is compressed to allow a lower end of the button assembly to be installed in the opening wherein the at least one flexible retaining member engages an inner surface of the seat panel to prevent removal, the button assembly being defined by a button housing having an upper end that includes a cover portion having a width that is larger than the opening such that the cover portion bears against an outer surface of the seat panel; and
    depressing an actuable button extending above the cover portion of the button housing causing a lower shaft portion extending from a lower portion of the button housing to engage a control cable activator supported by a lower end of the button housing to move a control cable of a seat moving mechanism from a first position to a second position.

18. The method according to claim 17, in which the control cable activator includes a first engagement arm that is engaged by the lower shaft portion and a second engagement arm attached to the control cable.

19. The method according to claim 18, in which the control cable activator is pivotally attached to the button housing.

20. The method according to claim 18, in which the first engagement arm is inwardly curved.

\* \* \* \* \*